Feb. 5, 1929.
R. C. MILLIRON
LAWN MOWER
Filed Feb. 17, 1927
1,701,416
2 Sheets-Sheet 1
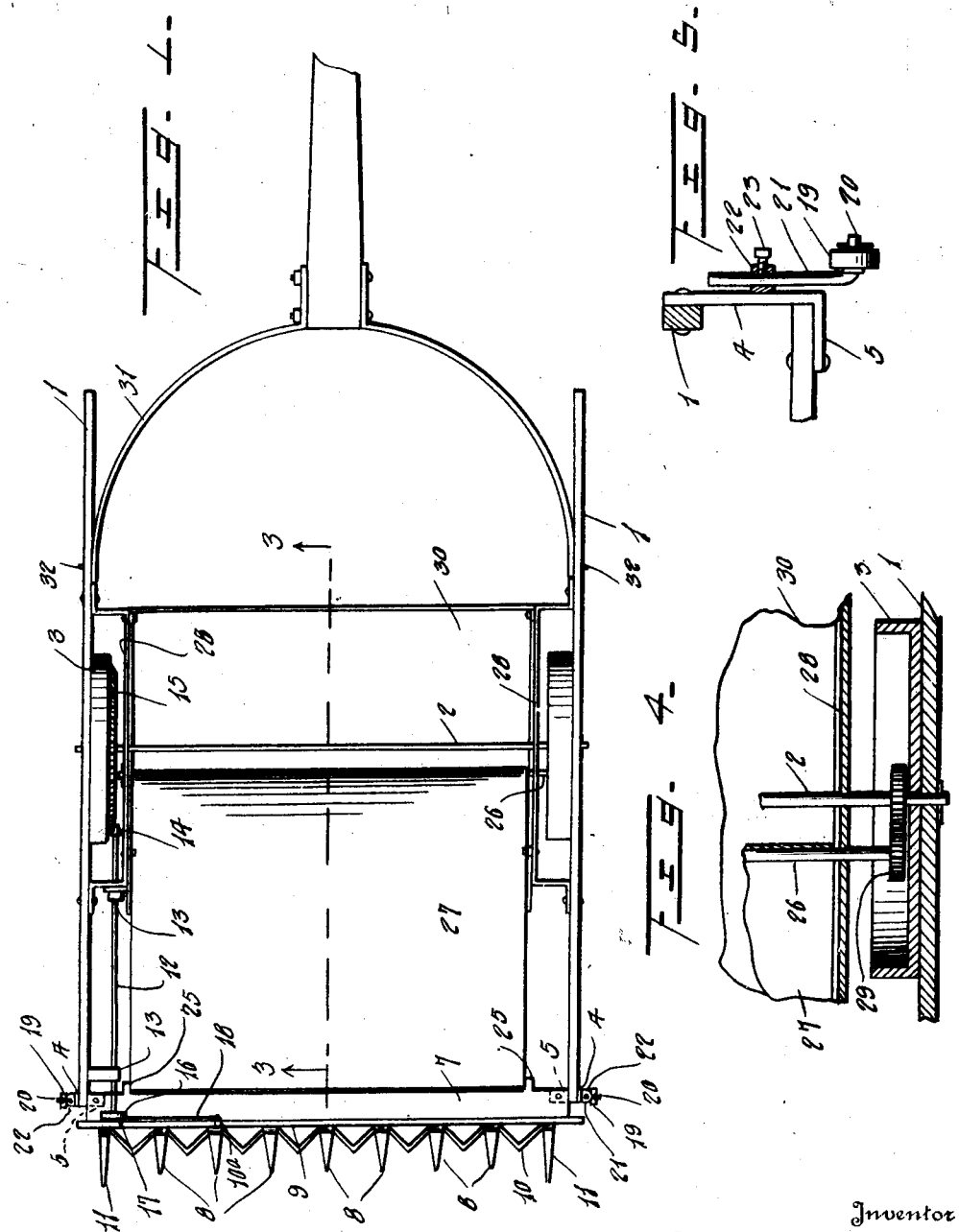

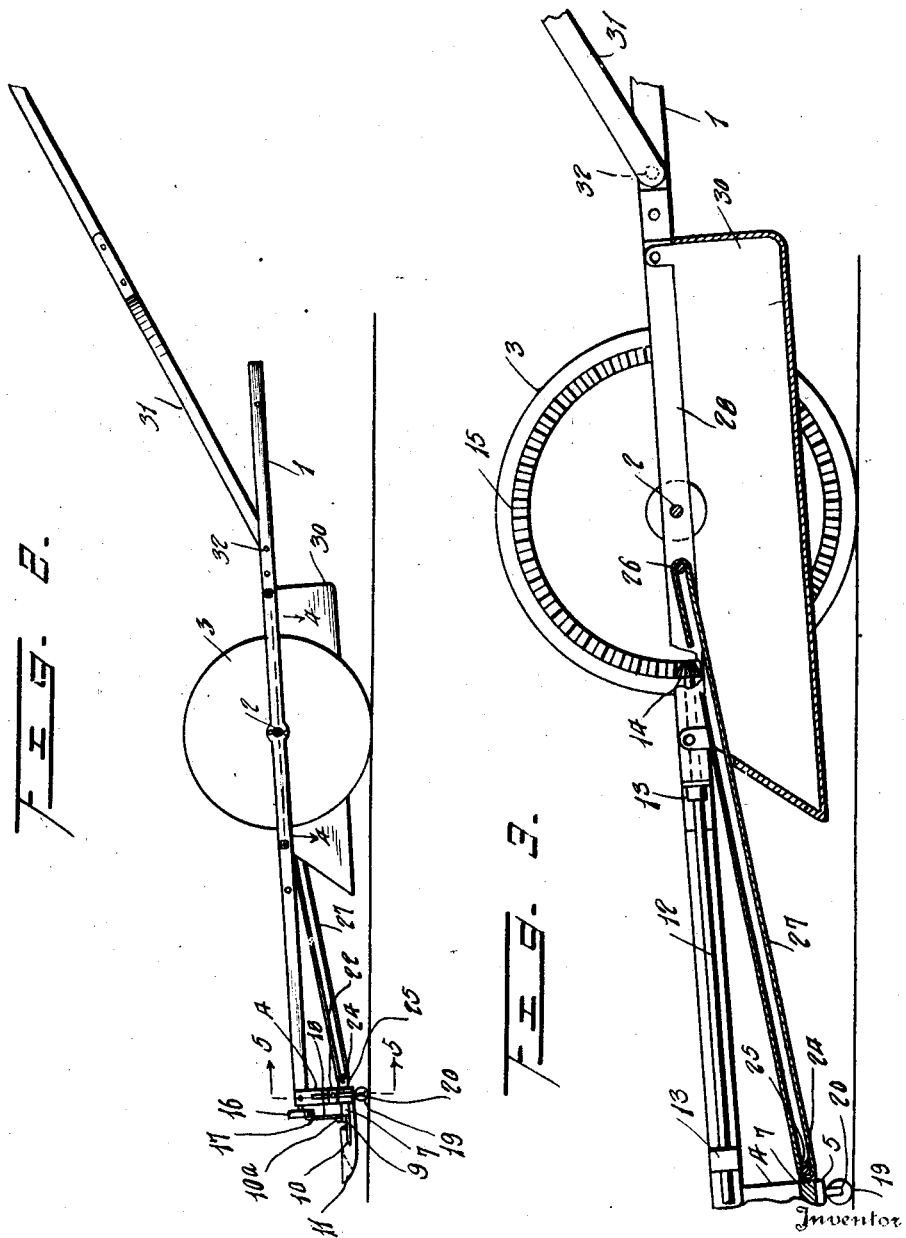

Patented Feb. 5, 1929.

1,701,416

UNITED STATES PATENT OFFICE.

RAYMOND C. MILLIRON, OF DEWEY, OKLAHOMA.

LAWN MOWER.

Application filed February 17, 1927. Serial No. 169,101.

This invention relates to lawn mowers and it consists of the construction, combination and arrangement of parts hereinafter fully described and claimed, and illustrated in the accompanying drawings, wherein:

Figure 1 is a top plan view of a lawn mower constructed in accordance with my invention, Figure 2 is a view in side elevation of the lawn mower, Figure 3 is a longitudinal sectional view taken on the vertical plane indicated by the line 3—3 of Figure 1, Figure 4 is a detail sectional view taken on the plane indicated by the line 4—4 of Figure 2, and Figure 5 is a detail sectional view taken on the plane indicated by the line 5—5 of Figure 2.

Corresponding and like parts are referred to in the following description, and designated in the accompanying drawings, by similar reference characters.

The lawn mower comprises side bars 1 pivoted intermediate their ends to an axle 2 to which ground wheels 3 are fixed. Arms 4 are secured to and depend from the front ends of the side bars 1, and are provided with inturned lower ends 5 to which the cutting mechanism is secured. This mechanism comprises a finger bar 7 which is secured to the ends 5 of the arms 4 and to which guard fingers 8 are secured, and a cutter bar 9 which is slidably mounted on the finger bar and to which blades 10 are secured. The finger bar 7 is provided at its ends with shoes 11, and the cutter bar 9 is provided at one end with an eye 10ª. A shaft 12 is journaled in bearings 13 secured to the inner side of one of the side bars 1 in advance of the ground wheels 3. The shaft 12 is provided at its rear end with a bevel pinion 14 which meshes with a bevel gear 15 which is secured to the inner side of the adjacent ground wheel 3. A disk 16 of sufficient weight to function as a balance wheel for the shaft 12, is secured to the front end of the shaft, and is provided with a wrist pin 17 to which one end of a pitman rod 18 is connected, the other end of the pitman rod being connected to the eye 10ª of the cutter bar 9. Rollers 19 are adjustably secured to the arms 4 to permit the height of the cutting mechanism from the ground to be regulated and to permit the cutting mechanism to be supported in a plane parallel with the surface of the ground. The rollers 19 are journaled on trunnions 20 which are carried by vertical bars 21. These bars 21 are mounted for vertical adjustment in sleeves 22 secured to the outer sides of the arms 4, and are adapted to be secured in adjusted position by set screws 23. A shaft 24 extending transversely of the mower is journaled in bearings 25 secured to the rear side of the finger bar 7, and passing about this similarly arranged shaft and a shaft 26 is an endless conveyor 27. The shaft 26 is located in front of the axle 2, and is journaled in U-shaped brackets 28 secured to the inner sides of the side bars 1 at points forwardly and rearwardly beyond the wheels 3. The axle 2 extends through and is journaled in the brackets 28. The shaft 26 is driven from the axle 2 by gears 29, one of which is fixed to the axle and the other to the shaft. A basket 30 is secured to the brackets 28 and has its front end positioned beneath the rear end of the conveyor 27. A handle 31 is pivoted to and between the side bars 1 as at 32.

From the foregoing description, taken in connection with the accompanying drawings, it should be apparent that when the machine is pushed along the ground motion will be imparted to the wheels 3 and and the wheels will in turn impart motion to the cutter bar 9 and blades 10 and to the conveyor 27. The cut grass will, as the machine is advanced, fall upon the front end of the conveyor 27 and be carried by this conveyor to and deposited in the basket 30. It should also be apparent that the machine is simple, durable and inexpensive to manufacture and maintain in perfect working condition.

It should be understood that the drawings are merely illustrative and do not pretend to give exact proportions. Furthermore, the said drawings are illustrative of a preferred construction, it being my expectation that various changes and modifications may be made without departing from the spirit and scope of the invention.

What is claimed is:—

1. A lawn mower comprising ground wheels, side bars pivoted between their ends on the axle of the ground wheels, arms depending from the front ends of the side bars and provided with inturned lower ends, a cutting mechanism secured to said inturned ends and including a reciprocal bar carrying blades, a shaft journaled on one of said side bars for rotation by one of said wheels, and an operative connection between said shaft and cutter bar.

2. A lawn mower comprising ground wheels, side bars pivoted between their ends on the axle of the ground wheels, arms depending from the front ends of the side bars and provided with inturned lower ends, a cutting mechanism secured to said inturned ends and including a reciprocal bar carrying blades, a shaft journaled on one of said side bars for rotation by one of said wheels, an operative connection between said shaft and cutter bar, a shaft journaled on the cutting mechanism, a second shaft supported from said side bars and adapted to receive motion from said axle, an endless conveyor passing about said shafts, and a basket secured to the side bars below the rear end of the conveyor.

3. A lawn mower comprising an axle, ground wheels fixed to the axle, side bars pivoted on the axle, means adjustably supporting the front ends of the side bars, a cutting mechanism secured to the front ends of the side bars, an operative connection between one of said ground wheels and the cutting mechanism, a shaft journaled on the cutting mechanism and extending transversely of the mower, U-shaped brackets secured to the inner sides of the side bars at points forwardly and rearwardly beyond the wheels and providing bearings for the axle, a shaft extending transversely of the mower and journaled in the brackets, an operative connection between said last shaft and the axle, an endless conveyor passing over said shafts, and a basket carried by the brackets and having its front end disposed beneath the rear end of the conveyor.

In testimony whereof I affix my signature.

RAYMOND C. MILLIRON.